Aug. 27, 1968
D. SCARAMUCCI
3,398,925
COMPOSITE SEAT BALL VALVE
Filed Jan. 10, 1966
2 Sheets-Sheet 1
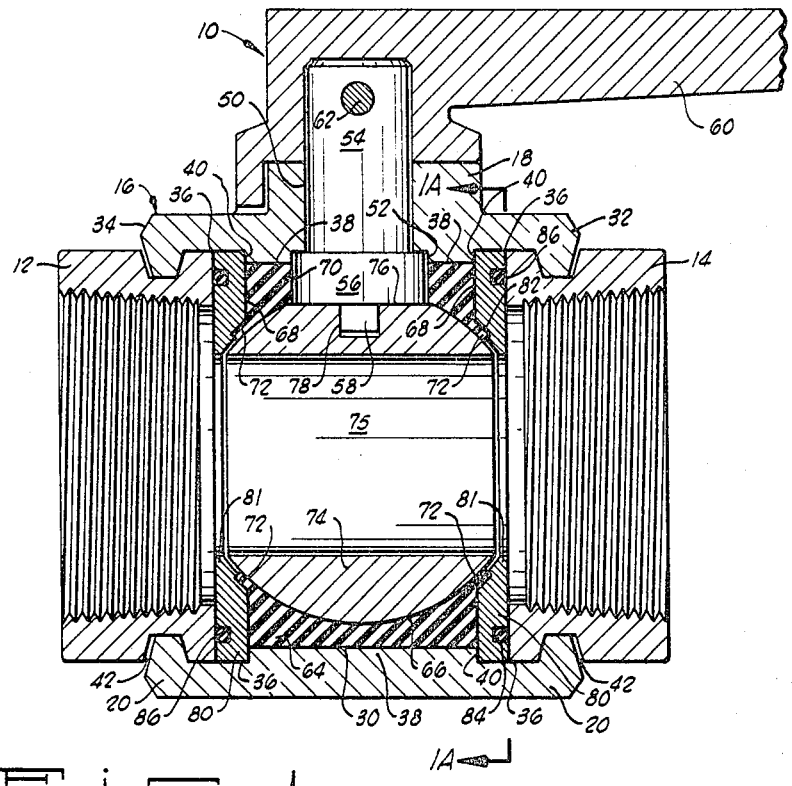
INVENTOR.
DOMER SCARAMUCCI
BY
Dunlap and Laney
ATTORNEYS

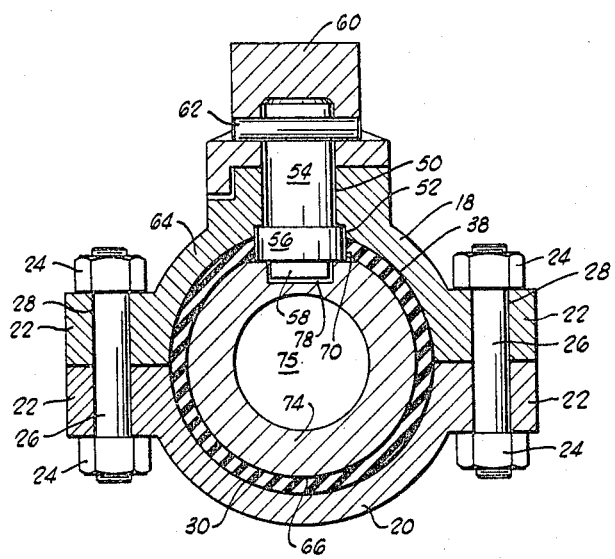
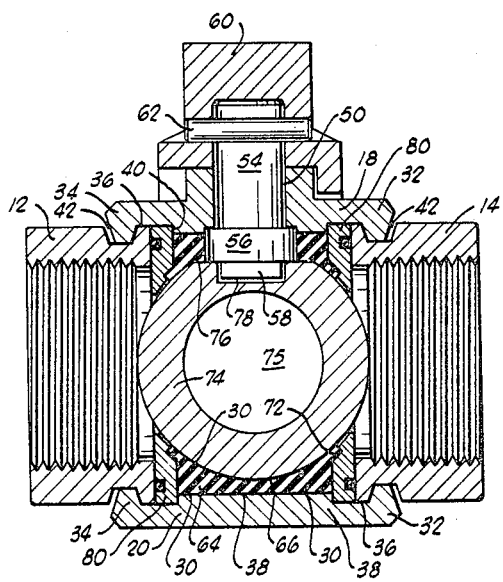
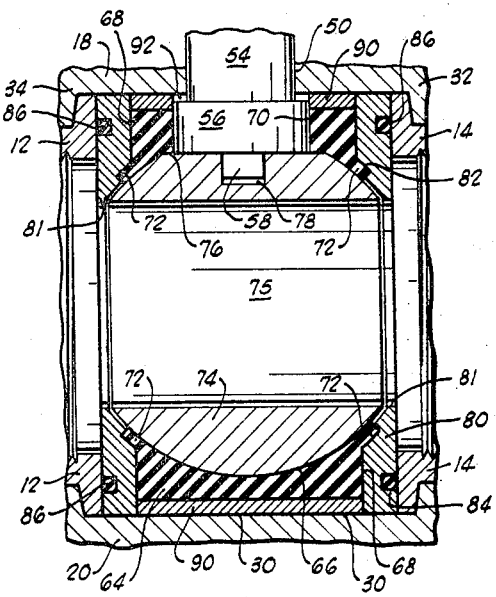

United States Patent Office 3,398,925
Patented Aug. 27, 1968

3,398,925
COMPOSITE SEAT BALL VALVE
Domer Scaramucci, Oklahoma City, Okla., assignor to Balon Corporation, Oklahoma City, Okla., a corporation of Oklahoma
Continuation-in-part of application Ser. No. 319,218, Oct. 28, 1963. This application Jan. 10, 1966, Ser. No. 519,500
31 Claims. (Cl. 251—148)

This application is a continuation-in-part of my application Ser. No. 319,218 filed Oct. 28, 1963, now Patent No. 3,244,938, and entitled, "Composite Seat Ball Valve." The invention relates generally to improved ball valves and, more particularly, but not by way of limitation, to improved seal structures for use in ball valves.

In my cited co-pending application, a one-part or unitary seal member is provided in a ball valve for the purpose of preventing leakage between the valve ball and the valve body. The single seal which is provided in the structure described in the co-pending application also functions to provide a fluid tight seal around the operating member or stem of the valve. A pair of metallic reinforcing rings are provided at each end of the resilient sealing member in coaxial alignment with the flow passageway through the valve ball, and function to provide support for the sealing member, and to evenly distribute the compressive forces exerted by flange members of pipe or conduit sections between which the valve is positioned.

The present invention provides a ball valve of the composite or unitary seal type in which the seal is improved in its sealing capabilities and service-life characteristics so that the wear imparted to the seal by the rotation of the ball member therein is more uniformly distributed over the surface of the seal which contacts the valve ball, and there is less tendency, when the valve is disposed between two spaced sections of pipe or conduit, for the seal member to be placed in excessive compression against the valve ball, and thus cause binding, or difficulty in accomplishing the necessary rotative movement of the valve ball from an open to a closed position.

Broadly described, the present invention comprises a valve body having a first end and a second end, and having a bore extending between the two ends which is preferably cylindrical in configuration, the valve body further having a valve stem opening between the two ends thereof, which opening communicates with the cylindrical bore and extends substantially normal thereto. Positioned in the bore through the valve body is a one-piece, unitary resilient sealing member which defines a frusto-spherical internal cavity which is open at the opposite sides of the sealing member and which is in communication with the bore through the valve body. The sealing member is characterized in having a pair of spaced, parallel substantially planar end faces surrounding the openings into the frusto-spherical cavity at the opposite sides of the sealing member. A valve stem opening is formed through the sealing member in alignment with the valve stem opening in the valve body, and communicates with the internal frusto-spherical cavity of the sealing member.

A valve ball is positioned in the frusto-spherical cavity in sealing engagement with the sealing member and has a flow passageway extending diametrically through the ball and communicating with the bore through the valve body. The valve ball has first and second ends which project out of the openings into the frusto-spherical cavity on the opposite sides of the sealing member. Means is provided on the valve ball between the first and second ends of the ball and on the outer peripheral surface thereof for engaging a valve stem.

A pair of rigid reinforcing members bear against, and are preferably bonded to, the planar end faces of the resilient sealing member and have central openings formed therein which are aligned with the openings of the flow passageway through the ball. Each of the rigid reinforcing members has a larger radial dimension than the planar end faces of the sealing member, and thus can be described as having a first portion which extends radially inwardly past the sealing member toward one of the projecting ends of the ball, and a second portion extending radially outwardly past the sealing member toward the valve body. Rigid spacer means is provided in the valve body in contact with the outer periphery of the sealing member, and functions to space the rigid reinforcing members from each other and limit the compression of the sealing member when the reinforcing members are forced toward each other by connection of the valve body between two pipe or conduit sections. The rigid spacer means has an opening therein which is aligned with the stem openings in the sealing member and the valve body for the accommodation of the valve stem. Finally, the invention includes a valve ball operating stem extending through the stem openings in the sealing member and valve body, and through the aligned opening in the rigid spacer means. The operating stem is dimensioned to sealingly engage the sealing member to prevent leakage around the stem of fluid flowing through the valve.

An important feature of the invention as thus constructed is the cooperation between the valve ball, the sealing member, the rigid reinforcing members and the rigid spacer means. The dimensions and location of the rigid reinforcing members are such that a metal-to-metal contact is provided with the valve ball when the valve is in use in high pressure service, and simultaneously, the rigid spacer means functions to prevent compression of the resilient sealing member between the rigid reinforcing members to the extent that binding of the valve ball occurs so that the ball cannot be turned easily within the sealing member between opened and closed positions.

In a preferred embodiment of the invention, the valve body is a two-part structure which can be assembled by bolting the two parts to each other to form the preferably cylindrical bore accommodating the resilient sealing member. A preferred embodiment of the invention also entails the formation of the rigid spacer means hereinbefore described as an integral part of the valve body, with the spacer means taking the form of an inwardly projecting rib having a shoulder at each end thereof for limiting the movement of the two rigid reinforcing members toward each other in an axial direction (with respect to the cylindrical passageway through the valve body). Alternately, a separate sleeve may be inserted within the valve body to function as the rigid spaced means and limit the distance which the rigid reinforcing members are permitted to move toward each other when the valve is positioned between two conduit or pipe sections as hereinbefore described.

From the foregoing description of the invention, it will be apparent that it is an important object of the invention to provide an improved ball valve incorporating a one-piece resilient sealing member, with the valve being simple and economical to manufacture.

An additional object of the invention is to provide a ball valve being characterized by a one-piece seal construction in which a metal-to-metal seal is provided when the valve is in use in high pressure service, and a sensitive low pressure seal is provided between a resilient sealing member and the valve ball in low pressure service.

A further object of the invention is to provide an improved ball valve in which the valve ball may be rotated easily within its resilient sealing member during all conditions of operation of the valve, and without the occurrence of binding or sticking.

A further object of the invention is to provide an improved ball valve in which the valve body is of two-part or split construction, thus facilitating the rapid removal of the valve ball and its surrounding sealing member from the valve body for replacement or repair.

In addition to the foregoing described objects and advantages, additional objects and advantages will become apparent as the following detailed description is read in conjunction with the accompanying drawings which illustrate the invention.

In the drawings:

FIGURE 1 is a vertical sectional view through the center of the improved ball valve assembly of the invention with the section being taken in a plane extending parallel to the direction of fluid flow through the valve, and showing the valve in an open position.

FIGURE 1A is a sectional view taken along line 1A—1A of FIGURE 1.

FIGURE 2 is a cross sectional view of the seal subassembly of the ball valve as it appears when removed from the valve assembly shown in FIGURE 1.

FIGURE 3 is a vertical sectional view through the valve assembly illustrated in FIGURE 1, but taken in a plane extending transversely through the valve with respect to the direction of fluid flow therethrough, and extending at 90° to the plane of the section shown in FIGURE 1.

FIGURE 4 is a sectional view similar to the sectional view shown in FIGURE 1, but taken after the valve ball has been rotated 90° to a closed position.

FIGURE 5 is a sectional view taken in the same plane as the section shown in FIGURE 1 and through a portion of a valve assembly illustrating a modified embodiment of the invention.

Referring now to the drawings in detail, and particularly to FIGURES 1 and 2, the ball valve assembly of the invention is designated generally by reference character 10, and is shown connected between a pair of internally threaded pipe or conduit sections designated by reference characters 12 and 14. In the illustrated embodiment of the invention, the assembly includes a valve body 16 which, in the illustrated embodiment, is of two-part or split construction, and includes a stem receiving upper part 18 and a lower part 20. As most clearly illustrated in FIGURE 3, the parts 18 and 20 of the valve body 16 are generally cylindrical in configuration, and each include a pair of radially outwardly extending flanges 22 which permit the two parts of the valve body to be interconnected by means of nuts 24 and bolts 26 extended through suitable apertures 28 provided in the flanges 22.

When the two parts 18 and 20 of the valve body 16 are connected in the manner shown in FIGURE 3, the body defines a generally cylindrical bore 30 extending between first and second ends of the valve body designated by numerals 32 and 34, respectively. A pair of semicircular grooves 36 are formed in each of the parts 18 and 20 of the valve body 16, and the grooves 36 in the parts are aligned and extend coaxially or concentrically with respect to the cylindrical bore through the body when the two parts 18 and 20 are assembled (see FIGURES 1 and 3). The grooves 36 are spaced axially in the valve body 16, and define between them a radially inwardly extending rib 38 having a shoulder 40 at its opposite ends. The grooves 36 are each wider at their open, radially inner portions than at their base so that the sides of the grooves opposite the shoulders 40 are beveled or inclined in an axial direction for a purpose hereinafter described.

In referring to FIGURE 1, it will be noted that in the particular valve assembly illustrated, the internally threaded pipe sections 12 and 14 are provided with external, circumferentially extending grooves 42 having beveled sides to permit the conduit sections to be drawn toward each other as the valve body 16 is interconnected therewith.

The upper body part 18 is provided with a valve stem opening 50 extending radially therethrough, and communicating with the cylindrical bore 30 formed between the ends 32 and 34 of the valve body 16. The valve stem opening 50 preferably communicates with the bore 30 through a counterbore 52 at the internal semicylindrical surface of the upper body part 18. A valve stem 54 extends through the stem opening 50 and is provided with a circumferential shoulder 56 which is received in the counterbore 52 (see FIGURE 3) and carries a ball key 58. A handle 60, or other suitable operating member, is connected to the valve stem 54 by a suitable pin 62 so that the valve stem may be rotated about its axis by pivotation of the handle 60.

A one-piece or unitary resilient sealing member 64 is located within the cylindrical bore 30 extending through the valve body 16. The one-piece resilient sealing member 64 in the illustrated embodiment is generally cylindrical in its external configuration and bears at its outer periphery against the radially inwardly extending rib 38 of the valve body 16. A frusto-spherical cavity 66 is formed in the center of the resilient sealing member 64, and is open at the opposite sides of the sealing member for communication with the bore 30 through the valve body 16. The sides of the resilient sealing member 64 through which the openings to the frusto-spherical cavity 66 are formed may be said to constitute a pair of spaced, parallel substantially planar end faces 68 (see FIGURE 2) which surround the openings to the frusto-spherical cavity and extend substantially normal to the axis of the cylindrical bore 30 through the valve body 16. A radial valve stem opening 70 is formed through the resilient sealing member 64 between the planar end faces 68 thereof for receiving the shoulder 56 of the valve stem, and placing the counterbore 52 of the valve stem opening in communication with the frusto-spherical cavity 66 in the sealing member.

It should be noted that the physical dimensions of the one-piece resilient sealing member 64 in its relaxed state are such that the sealing member will be compressed slightly when the upper and lower halves 18 and 20 of the valve body 16 are assembled, as shown in FIGURE 3, and that the radial valve stem opening 70 for the accommodation of the valve stem shoulder 56 is slightly smaller than the valve stem shoulder so that the opening must be distended or enlarged slightly when the valve stem is operatively positioned as shown in FIGURES 1 and 3. These dimensions of the sealing member 64 assure that a tenacious fluid tight seal will be established between the sealing member and the valve body 16, as well as between the sealing member and the valve stem when the valve is assembled.

In the illustrated embodiments of the invention, the one-piece resilient sealing member 64 is provided with annular sealing lips 72 at the radially inner edge of each of the planar end faces 68. Each sealing lip 72 extends in an axial and radially inward direction from the respective end face 68 of the sealing member 64, and is relatively thin so as to be quite sensitive to the impress of fluid forces thereon and provide a low pressure sealing structure. The sealing lips 72 also assist in the positioning of a pair of rigid reinforcing members which are positioned on the end faces 68 of the sealing member 64 as hereinafter described.

A metallic valve ball 74 of generally frusto-spherical configuration is positioned within the frusto-spherical cavity 66 formed in the resilient sealing member 64, and has its outer peripheral surface in sealing engagement with the portion of the sealing member which defines the frusto-spherical cavity. The valve ball 74 has a fluid flow passageway 75 extending diametrically therethrough and communicating with the cylindrical bore 30 formed through the valve body 16. It will be noted that the valve ball 74 is dimensioned so that the opposite sides thereof extend out of the openings in the sealing member 64, and into the cylindrical bore 30 formed in the valve body 16. In the illustrated construction of the valve assembly, the valve ball 70 has a flattened surface 76 on one side thereof which bears against the inner surface of the shoulder 56 of the valve stem. A slot 78 is formed in the surface 76 for receiving the ball key 58 of the valve stem and permitting the valve ball 70 to be rotated when the stem is turned by use of the handle 60.

Positioned at opposite sides of the one-piece resilient sealing member 64 and in contact with the planar end faces 68 thereof are a pair of rigid annular reinforcing members 80. The reinforcing members 80 are preferably bonded to their respective end faces 68 by the use of a suitable adhesive. The annular reinforcing members 80 can be suitably constructed of metal or plastic, the primary requirement being that the reinforcing members have sufficient rigidity to withstand without distortion, the fluid pressures which may act thereon during the use of the valve assembly, particularly those encountered in high pressure surface. Each of the rigid reinforcing members 80 is provided with a central aperture 81 therein which is aligned with the respective opening through the ball member 74.

The dimension of the rigid reinforcing members 80 are such that each of these members includes a radially outer portion which extends radially outwardly beyond the respective planar end face 68 of the sealing member 64 (see FIGURE 2) and into abutting contact with the shoulder 40 formed at the end of the ridge 38 (see FIGURE 1). A radially inner portion of each reinforcing member 80 also extends radially inwardly past the inner terminus of the sealing member 64 and past the respective sealing lip 72 and into close proximity to the respective protruding end portion of the valve ball 74. The thickness of each of the reinforcing members 80 is preferably approximately one-half that of the grooves 36 formed in the valve body 16 so that the ends of the pipe sections 12 and 14 can also be accommodated in these grooves.

Adjacent the radially inner portion of each of the rigid reinforcing members 80, each reinforcing member is provided on its side abutting the planar end face 68 of the sealing member 64 with an annular triangular cross sectioned groove 82 which receives the annular sealing lip 72 of the resilient sealing member. On the opposite side of each of the reinforcing members 80, an annular groove 84 is provided for accommodating an annular resilient sealing ring 86 which is dimensioned to protrude beyond the planar end face of the rigid reinforcing members when the sealing ring is positioned in the annular groove.

*Operation*

In asesmbling the ball valve of the invention, the valve ball 74 is first positioned within the one-piece resilient sealing member 64 either by molding the sealing member about the ball while the valve stem is in place thereon, or by forcing the ball into the spherical cavity in the sealing member through an appropriate slot (not shown) formed in the bottom portion thereof, and then forcing the valve stem into position through the stem aperture 70 formed in the sealing member. The rigid reinforcing members 80 are then placed in the illustrated position in abutting contact with the planar end faces 68 of the resilient sealing member 64 and are preferably bonded thereto as hereinbefore described. After the valve ball 74 has been positioned in the sealing member 64 with the valve stem and reinforcing members 80 in position, the two parts 18 and 20 of the valve body 16 are then positioned around the sealing member 64 with the ends 32 and 34 of the valve body interlocked with the grooves 42 in the pipe sections 12 and 14. When the body halves 18 and 20 of the valve body 16 are initially placed in position and in contact with the sealing member 64, the rigid reinforcing members 80 will be spaced slightly from the shoulders 40 at each end of the ridge 38. As the nuts 24 are tightened on the bolts 26 to draw the body halves 18 and 20 toward each other, the beveled side of the grooves 36 in the valve body parts bears against and forces the two pipe sections 12 and 14 toward each other so as to force the rigid reinforcing members 80 toward each other and against the shoulders 40.

As the nuts 24 are further tightened on the bolts 26 to bring the body parts 18 and 20 into abutting contact, the resilient sealing member 64 is placed in compression and forms a tight seal with the valve ball 74 and with the rib 38 of the valve body 16. The sealing member 64 is also placed in compression in an axial direction by the convergent movement of the rigid reinforcing members 80, and the combined compressive forces exerted by the valve body 16 and the rigid reinforcing members establish an effective seal around the shoulder 56 of the valve stem by the resilient sealing member. It should be noted that the shoulders 40 at each end of the rib 38 function to limit the distance which the rigid reinforcing members 80 can move toward each other, and therefore to limit the degree of compression of the resilient sealing member 64 which can occur. The shoulders 40 thus function to prevent binding of the valve ball 74 as a result of excessive compression of the sealing member 64. It will further be noted that the shoulders 40, in limiting the axial movement of the rigid reinforcing members 80, function to permit the radilly inner portions of the rigid reinforcing members 80 to move into close proximity to the protruding end of the valve ball 74. Thus, during high pressure service of the valve, the downstream rigid reinforcing member 80 is caused by the high pressure to bear against the valve ball 74 and provide a high pressure metal-to-metal seal. The close proximity of the reinforcing members 80 to the valve ball 74 also assures that should a fire in the vicinity of the valve cause the resilient sealing member 64 to be destroyed, the valve will still partially function and the ball will not be extruded out of the valve body 16 by high pressure.

The sealing rings 86 sealingly engage the ends of the pipe sections 12 and 14 to prevent the leakage of fluid around the outer ends of the rigid reinforcing members 80 and infiltration between the sealing member 64 and the valve body 16. The relatively thin sealing lips 72 which are provided on the sealing member 64 are quite sensitive in their response to relatively low fluid pressures and form an effective seal between the valve ball 74 and the reinforcing members 80 during low pressure service.

A modified embodiment of the invention is illustrated in FIGURE 5. This embodiment differs from the FIGURE 1–4 embodiment in that the radially inwardly extending rib 38, which functions in the latter embodiment to space the reinforcing members 80, and prevent excessive compression of the resilient sealing member 64, is replaced by a generally cylindrical metallic sleeve 90. This metallic sleeve is dimensioned to bear against the inner peripheral wall of the valve body 16, and is provided with a stem opening 92 therein to receive the shoulder 56 on the valve stem 54. The sleeve 90 functions in substantially the same way as the radially inwardly extending ridge 38, but requires less machining of the two parts 18 and 20 of the valve body 16, and also can be replaced in the event of damage or excessive wear occurring at its surface in sealing contact with the resilient sealing member 64. Preferably, the sleeve 90 is pressed over the sealing member 64 after the valve ball 74 has been positioned within the sealing member and is bonded by a suitable adhesive to the external periphery of the sealing member.

The improved ball valve assembly of the present invention performs efficiently in both high and low pressure conditions of operation, is possessed of all of the advantages previously recognized to characterize a one-piece or unitary composite seal ball valve, and can be quickly and easily assembled at a relatively low cost. The frequency of maintenance and repair of the valve is substantially reduced as a result of the inclusion in its structure of features which prevent over-compression of the resilient sealing member so as to cause binding of the rotating valve ball, and the valve is characterized in providing metal-to-metal high pressure seals which are established when the valve is operating in high pressure service, and has relatively sensitive low pressure sealing lips which respond to low fluid pressures to establish an effective seal during low pressure service.

Although certain specific embodiments of the invention have been herein described and illustrated in order to provide an example of the invention enabling those skilled in the art to practice it, it is to be understood that various modifications and innovations can be effected in the described and depicted structure without departure from the basic principles which underlie the invention. For example, the valve body 16 need not necessarily be made in two parts to realize all of the advantages of the invention, nor need its external periphery be cylindrical. The resilient sealing member 64 can be split or slotted at the bottom thereof to permit the valve ball 74 to be inserted in the frusto-spherical cavity. The pipe sections 12 and 14 can be interconnected to each other through the valve by other instrumentalities than interlocking grooves. The low pressure sealing lips 72 can be omitted from the structure while still retaining many of the structural features which make the ball valve assembly a novel combination performing superiorly in many respects to other ball valves. All such modified structures which continue to rely upon the basic principles of the invention are deemed to be circumscribed by the spirit and scope of the invention except as the same may be necessarily excluded by the appended claims or reasonable equivalents thereof.

What is claimed is:
1. A ball valve assembly comprising:
   a valve body having a first end and a second end and having a bore extending between said ends, said valve body further having a valve stem opening between the ends of the valve body communicating with said bore and extending substantially normal thereto;
   a one-piece, unitary resilient sealing member positioned in said bore between the ends of said body and having a pair of spaced, parallel, substantially planar end faces and defining a frusto-spherical cavity open at the center of each of said planar end faces, said sealing member further having a valve stem opening therein aligned with the valve stem opening in said valve body and communicating with the frusto-spherical cavity;
   a valve ball in said frusto-spherical cavity in sealing engagement with said sealing member and having a flow passageway extending diametrically through the valve ball and communicating with the bore through said valve body, said valve ball having first and second ends projecting out of the frusto-spherical cavity in the sealing member at the openings to said frusto-spherical cavity in the planar end faces of said sealing member, and having means between the first and second ends of the valve ball and on the outer peripheral surface of the valve ball for engaging a valve stem;
   a pair of rigid reinforcing members bearing against the planar end faces of the resilient sealing member and surrounding the openings of the fluid passageway through said valve ball, said pair of reinforcing members having a larger radial dimension than the planar end faces of the sealing member and thus each having a first portion extending radially inwardly past said sealing member toward one of the projecting ends of said ball, and a second portion extending radially outwardly past said sealing member toward said valve body;
   rigid spacer means in said valve body contacting the outer periphery of said sealing member and said pair of rigid reinforcing members for spacing said rigid reinforcing members from each other, and limiting the compression of said sealing member when said reinforcing members are forced toward each other by connection of the valve body between two pipe sections, said rigid spacer means having an opening therein aligned with said stem opening; and
   a valve ball operating stem extending through said stem openings and through the opening in said rigid spacer means and in sealing engagement with said sealing member.

2. A ball valve assembly as claimed in claim 1 wherein said rigid spacer means comprises an annular rib formed integrally with, and projecting inwardly in, said valve body, said rib surrounding the bore extending through said valve body, said rib terminating in annular shoulders at each end thereof, said shoulders contacting and spacing said rigid reinforcing members.

3. A ball valve assembly as claimed in claim 1 wherein said spacer means comprises an annular sleeve positioned between said resilient sealing member and said valve body and between said pair of rigid reinforcing members.

4. A ball valve assembly as claimed in claim 1 wherein said rigid reinforcing members are each constructed of metal and are bonded to the respective planar end faces of said resilient sealing member.

5. A ball valve assembly as claimed in claim 1 wherein said resilient sealing member is further characterized as including a pair of annular, low pressure sealing lips surrounding the openings into said frusto-spherical cavity through said planar end faces.

6. A ball valve assembly as claimed in claim 1 wherein said valve body is characterized in having a pair of spaced annular grooves formed internally therein and surrounding said bore, and wherein said rigid reinforcing members are disc-shaped metallic members each having an opening in the central portion thereof aligned with the flow passageway in said valve ball when the valve ball is in the open position, and each further having an outer peripheral portion extending into one of the annular grooves.

7. A ball valve assembly as claimed in claim 6 wherein each of said rigid reinforcing members is further characterized in having an annular, triangular cross sectioned groove in the surface thereof bearing against the respective planar end face of said resilient sealing member, and said resilient sealing member is further characterized in having a pair of annular, low pressure sealing lips surrounding the openings into said frusto-spherical cavity through said planar end faces with said lips projecting into and being engaged by the grooves in said reinforcing members.

8. A ball valve assembly as claimed in claim 6 wherein each of said reinforcing members is further characterized in having an annular groove in the surface thereof opposite and parallel to the surface bearing against the respective planar end face, said groove surrounding the opening in the central portion of the reinforcing member;
   and wherein said valve assembly is further characterized in having a sealing ring seated in the annular grooves in each of said reinforcing members.

9. A ball valve assembly comprising:
   a pair of pipe sections each having an annular groove formed therearound adjacent an end of the pipe section, said annular grooves each having a tapered side nearest the adjacent end of the respective pipe section whereby each groove is narrower at its base than at its opening;
   a two-part valve body interconnecting said pipe sections and comprising
   an upper part having an outer surface and a semi-cylindrical inner surface, and further having a stem opening extending therethrough from the outer to the inner surface;

a lower part having an outer surface and a semi-cylindrical inner surface; and means joining said upper and lower parts to each other to form a valve body having a cylindrical bore therethrough, said valve body having first and second ends between which said bore extends, said upper and lower parts each having a pair of spaced semicircular grooves in the inner surface thereof with the grooves in the two parts aligned to form two annular grooves surrounding said bore when said upper and lower parts are mated by joining, said two annular grooves each interlocking with one of the grooves formed adjacent the ends of the pipe sections to place the pipe sections in communication with each other through the valve body;

a resilient sealing member positioned in said cylindrical bore between the semicircular grooves in the body parts and having a ball receiving cavity in the center thereof, said sealing member further having a pair of planar end faces extending substantially normal to the axis of said cylindrical bore, and having openings through the center of the planar end faces into said ball receiving cavity, and said sealing member further having a stem opening extending into said ball receiving cavity and aligned with the stem opening in the upper part of said valve body;

a valve ball in said ball receiving cavity and protruding through the openings in the planar end faces of said sealing member, said ball having a fluid flow passageway therethrough aligned with the openings in the planar end faces in said sealing member, and with said cylindrical bore;

rigid reinforcing members bearing against the planar end faces of said sealing member, each reinforcing member having an outer peripheral portion positioned in one of the annular grooves in said valve body and against an end of one of said pipe sections, and each reinforcing member further having an opening in the center thereof aligned with the fluid flow passageway in said ball, and of smaller size than the openings in the planar end faces of said sealing member; and an operating stem extending through the stem openings in the upper part of said valve body and in said sealing member and cooperating with said valve ball.

10. A ball valve assembly as claimed in claim 9 wherein each of said reinforcing members has a pair of planar, parallel surfaces, one of which abuts the respective planar end face of said sealing member, and each reinforcing member being further characterized in having a groove in said one planar surface receiving a portion of said sealing member which projects from the respective planar end face.

11. A ball valve assembly as claimed in claim 9 wherein said sealing member, in its relaxed uncompressed state, has an axial dimension, as measured along the axis of the cylindrical bore through said valve body, which is greater than the distance between the semicircular grooves in each part of the valve body.

12. A ball valve assembly as claimed in claim 9 and further characterized to include resilient sealing means between each of said reinforcing members and the adjacent end of one of said pipe sections.

13. A ball valve assembly as claimed in claim 9 and further characterized to include sealing lips extending from said sealing member into sealing contact with a portion of the outer peripheral surface of said valve ball.

14. A ball valve assembly as claimed in claim 9 wherein said valve body is dimensioned, and said reinforcing rings are positioned, to place said resilient sealing member in axial and radial compression when said ball valve assembly is operatively assembled.

15. In a valve of the type having a valve body, a valve ball movably mounted in the valve body and having a cylindrical flow passageway therethrough, and an operating stem extending through the valve body and engaging the valve ball for moving the ball between valve opening and valve closing positions, the improvement which comprises:

a resilient sealing member between the valve ball and valve body and having opposed, generally parallel planar end faces with openings therethrough aligned with the cylindrical passageway through said valve ball, said sealing member sealingly contacting all of the outer peripheral surface of said valve ball except the portions immediately adjacent the open ends of the cylindrical flow passageway through the ball;

rigid reinforcing members bearing against the parallel planar end faces of said sealing member; and rigid spacer means between said sealing member and valve body, and contacting each of said reinforcing members to space said reinforcing members and prevent excessive compression of said sealing member around said valve ball.

16. The improvement claimed in claim 15 wherein said rigid spacer means comprises a rigid cylindrical sleeve surrounding said sealing member and extending between said reinforcing members.

17. The improvement claimed in claim 15 wherein said rigid spacer means comprises a rib projecting inwardly from said valve body into contact with said resilient sealing member and positioned between said rigid reinforcing members.

18. The improvement claimed in claim 15 wherein said rigid reinforcing members are grooved in the surfaces thereof bearing against the planar end faces of said sealing member, and said sealing member is further characterized to include sealing lip portions extending into the grooves in said reinforcing members.

19. The improvement claimed in claim 16 wherein said sealing member is bonded to said sleeve and to said reinforcing members.

20. The ball valve assembly comprising:

a valve body having a first end, a second end and a cylindrical bore between said first and second ends;

cylindrical spacer means inside said body and concentrically surrounding the axially central portion of said cylindrical bore;

a resilient sealing member in said valve body and having a cylindrical outer peripheral surface sealingly engaging said spacer means, said sealing member further having spaced, parallel planar end faces extending normal to the axis of said cylindrical bore and a frusto-spherical cavity in the center of said sealing member with circular openings thereinto through said planar end faces;

a pair of annular resilient sealing lips formed integrally with said sealing member and bounding the circular openings through said planar end faces into said frusto-spherical cavity, said sealing lips each having a surface adjacent said frusto-spherical cavity configured to mate with the outer periphery of a sphere, and each of said sealing lips having a radial thickness, as measured in a radial direction with respect to said frusto-spherical cavity, which is substantially less than the radial thickness of the sealing member as measured through any portion thereof;

a valve ball in said frusto-spherical cavity in sealing engagement with said sealing member and said sealing lips, said ball having a cylindrical fluid flow passageway extending diametrically therethrough and adapted to be aligned with the circular openings in the planar end faces of said sealing member, said valve ball having portions adjacent the open ends of said passageway which protrude through said circular openings and beyond said planar end faces;

an annular disc-shaped rigid reinforcing member bonded to each of the planar end faces of said sealing member and having a circular aperture in the center thereof aligned with the circular opening in the respective planar end face of said sealing member and of smaller diameter than said circular opening, each of said reinforcing members further having an annular groove therein surrounding said circular aperture and receiving one of said sealing lips, and each of said sealing members further having an outer peripheral portion disposed radially outwardly of said cylindrical outer peripheral surface of said sealing member with said spacer means positioned between the outer peripheral portions of the two rigid reinforcing members; and an annular resilient sealing ring positioned on the opposite side of each of said reinforcing members from said resilient sealing member and surrounding the circular aperture in the respective reinforcing member.

21. An improved seal structure for employment in a ball valve comprising:
a resilient sealing member having a pair of spaced, parallel, planar end faces and a frusto-spherical cavity in the center thereof opening through both of said planar end faces for containing the valve ball, said sealing member further having a stem opening between said planar end faces and communicating with said frusto-spherical cavity; and a pair of rigid, disc-shaped reinforcing members each having opposed, substantially planar, parallel surfaces and a circular aperture in the center of said surfaces of smaller diameter than the openings of the frusto-spherical cavity through the planar end faces of said sealing member, one of said reinforcing members being bonded to each of said planar end faces with the circular aperture aligned with the opening into said frusto-spherical cavity through the respective planar end face, and each reinforcing member having an outer peripheral portion extending beyond the outer edge of the respective planar end face of the sealing member, and further having an inner peripheral portion around the respective circular aperture and extending into the opening through the respective planar end face into the frusto-spherical cavity.

22. A seal structure as claimed in claim 21 wherein said sealing member has a cylindrical outer peripheral surface and said reinforcing members each have an outer edge forming the terminus of said outer peripheral portion and disposed radially outwardly with respect to the outer peripheral surface of said sealing member.

23. A seal structure as defined in claim 21 and further characterized to include a pair of sealing lips formed integrally with said sealing member and bounding the openings through the planar end faces of said sealing member into said frusto-spherical cavity.

24. A seal structure as defined in claim 23 wherein each of said lips is annular in configuration and has a surface adjacent said frusto-spherical cavity configured to mate with the outer periphery of a sphere, each of said lips further having a radial thickness, as measured from the center of said frusto-spherical cavity, which is substantially less than the radial thickness of the remainder of said sealing member.

25. A seal structure as defined in claim 23 wherein the planar, parallel surface of each of said reinforcing members which is bonded to a planar end face of said reinforcing member is grooved to receive one of said sealing lips.

26. A seal structure as claimed in claim 21 and further characterized to include resilient sealing means carried by each of said reinforcing members on the side thereof opposite the side bonded to said sealing member.

27. An improved ball valve seal comprising:
a resilient sealing member having an outer peripheral surface, a pair of substantially planar end faces extending substantially perpendicular to said outer peripheral surface, and an internal frusto-spherical cavity adapted to receive a valve ball and having circular openings thereinto through said planar end faces;

a rigid spacer sleeve around said sealing member in contact with the outer peripheral surface thereof and terminating in spaced relation to each of said end faces when said sealing member is in its relaxed, uncompressed state; and rigid reinforcing members bearing against each of said planar end faces and surrounding the openings through said end faces into said frusto-spherical cavity, said rigid reinforcing members each having an outer peripheral portion extending past the outer peripheral surface of said sealing member with the spacer sleeve disposed between said rigid reinforcing members, said rigid reinforcing members each having a circular opening in the center thereof of smaller diameter than the circular openings in the planar end faces of said resilient sealing member and concentrically positioned with respect to the openings in said planar end faces.

28. An improved ball valve seal as claimed in claim 27 wherein said reinforcing members are each disc-shaped with two substantially parallel, planar surfaces, one of which is bonded to the respective planar end face of said resilient sealing member, and wherein said spacer sleeve is bonded to the outer peripheral surface of said sealing member.

29. An improved ball valve seal as claimed in claim 27 wherein said reinforcing members are each disc-shaped with two substantially parallel planar surfaces, one of which abuts the respective one of the planar end faces of said sealing member, and said seal is further characterized to include a sealing ring mounted on the other of said planar surfaces on each of said reinforcing members and concentrically surrounding the circular openings through the respective reinforcing member.

30. An improved ball valve seal as claimed in claim 27 and further characterized to include thin flexible sealing lips extending from said sealing member and bounding the circular openings through the planar end faces of said sealing member.

31. An improved seal structure for employment in a ball valve comprising:
a resilient sealing member having a cylindrical outer peripheral surface, a pair of spaced, parallel substantially planar end faces extending substantially perpendicular to the axis of the cylindrical outer peripheral surface, and an internal frusto-spherical cavity adapted to receive a valve ball and having aligned circular openings thereinto through each of said planar end faces;

a pair of rigid, disc-shaped reinforcing members each having opposed, substantially planar, parallel surfaces and a circular aperture extending through each of said members in the center of said surfaces, said apertures each being of smaller diameter than the circular openings through the end faces of said sealing member, one of said reinforcing members being bonded to each of said end faces by one of the parallel surfaces thereof with the circular aperture therethrough concentrically aligned with the respective circular opening through the respective planar end face, and each of said reinforcing members having an annular outer peripheral portion positioned radially outwardly from the cylindrical outer peripheral surface of said resilient sealing member, the surface of each of said reinforcing members which is bonded to the respective end face of said sealing member having an annular groove formed therein concentrically around the circular aperture therethrough;

a flexible, resilient sealing lip connected to said sealing member and bounding the circular openings through the end faces thereof, said resilient sealing lips extending into the respective annular grooves of said reinforcing members and having sealing surfaces adjacent the respective openings in said end faces of a configuration to mate with and seal against the outer peripheral surface of a valve ball positioned in said frusto-spherical cavity; and sealing means on each of said reinforcing members positioned concentrically around the circular aperture therethrough on the surface thereof parallel to and opposite the surface bonded to the respective end face of said sealing member.

References Cited

UNITED STATES PATENTS 3,244,398   4/1966   Scaramucci _____ 251—148

WILLIAM F. O'DEA, *Primary Examiner.*

H. W. WEAKLEY, *Assistant Examiner.*